US010967618B2

(12) United States Patent
Furuya et al.

(10) Patent No.: US 10,967,618 B2
(45) Date of Patent: Apr. 6, 2021

(54) CURABLE COMPOSITION FOR FORMING PRIMER LAYER, GAS BARRIER LAMINATED FILM, AND GAS BARRIER LAMINATE

(71) Applicant: LINTEC CORPORATION, Tokyo (JP)

(72) Inventors: Takumi Furuya, Tokyo (JP); Satoshi Naganawa, Tokyo (JP); Yuta Suzuki, Tokyo (JP); Kenta Nishijima, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 16/085,858

(22) PCT Filed: Mar. 16, 2017

(86) PCT No.: PCT/JP2017/010664
§ 371 (c)(1),
(2) Date: Sep. 17, 2018

(87) PCT Pub. No.: WO2017/159787
PCT Pub. Date: Sep. 21, 2017

(65) Prior Publication Data
US 2019/0091980 A1    Mar. 28, 2019

(30) Foreign Application Priority Data

Mar. 18, 2016   (JP) .............. JP2016-055159

(51) Int. Cl.
B32B 27/30     (2006.01)
B32B 27/32     (2006.01)
C09D 123/02    (2006.01)
C09D 4/06      (2006.01)
C08J 7/04      (2020.01)
C08J 5/18      (2006.01)
C08L 23/02     (2006.01)
C08K 5/5419    (2006.01)

(52) U.S. Cl.
CPC .......... B32B 27/308 (2013.01); B32B 27/30 (2013.01); B32B 27/32 (2013.01); C08J 5/18 (2013.01); C08J 7/042 (2013.01); C08L 23/025 (2013.01); C09D 4/06 (2013.01); C09D 123/025 (2013.01); B32B 2307/7242 (2013.01); C08J 2323/02 (2013.01); C08J 2333/08 (2013.01); C08J 2367/02 (2013.01); C08J 2433/08 (2013.01); C08J 2483/08 (2013.01); C08K 5/5419 (2013.01); C08L 2203/16 (2013.01)

(58) Field of Classification Search
CPC ...... C08J 5/18; C08J 2323/02; C08J 2333/08; C08K 5/5419; C08L 2203/16; C08L 23/025; B32B 27/308; B32B 27/32; B32B 2307/7242

USPC ........................................................ 428/522
See application file for complete search history.

(56) References Cited

U.S. PATENT DOCUMENTS

2013/0209800 A1    8/2013  Uemura et al.
2015/0099094 A1*   4/2015  Suzuki ................ C08J 7/18
                                                            428/141
2016/0297181 A1   10/2016  Tanabe

FOREIGN PATENT DOCUMENTS

| JP | 62-195024 A  | 8/1987  |
|----|--------------|---------|
| JP | 63-81122 A   | 4/1988  |
| JP | 1-138108 A   | 5/1989  |
| JP | 2-84437 A    | 3/1990  |
| JP | 2-175726 A   | 7/1990  |
| JP | 4-63833 A    | 2/1992  |
| JP | 5-238827 A   | 9/1993  |
| JP | 5-345826 A   | 12/1993 |
| JP | 6-122852 A   | 5/1994  |
| JP | 6-299118 A   | 10/1994 |
| JP | 6-306329 A   | 11/1994 |
| JP | 9-31333 A    | 2/1997  |
| JP | 2000-239447 A| 9/2000  |
| JP | 2001-40037 A | 2/2001  |
| JP | 2003-145664 A| 5/2003  |
| JP | 2007-237588 A| 9/2007  |
| JP | 2011-121347 A| 6/2011  |

(Continued)

OTHER PUBLICATIONS

Translation of JP 2013-082106 (Application 2011-222603), May 9, 2013. (Year: 2013).*

(Continued)

Primary Examiner — Hui H Chin
(74) Attorney, Agent, or Firm — Birch, Stewart, Kolasch & Birch, LLP.

(57) ABSTRACT

The present invention is: a curable composition for forming a primer layer of a gas barrier laminated film, comprising at least a polar group-containing polyolefin polymer and a polyfunctional acrylate compound; a gas barrier laminated film having a primer layer made of a cured product of the curable composition; and a gas barrier laminate including an organic compound-containing layer laminated on the surface of the gas barrier laminated film. The present invention provides: a curable composition that is for forming a primer layer suitably used in manufacturing a gas barrier laminate excellent in interlayer adhesion, a gas barrier laminated film having a primer layer made of the cured product of the curable composition, and a gas barrier laminate comprising an organic compound-containing layer laminated on the surface of the gas barrier laminated film.

10 Claims, No Drawings

(56) References Cited

FOREIGN PATENT DOCUMENTS

| | | | |
|---|---|---|---|
| JP | 2012-106421 A | | 6/2012 |
| JP | 2013082106 A | * | 5/2013 |
| JP | 2013-226757 A | | 11/2013 |
| JP | 2014-198448 A | | 10/2014 |
| JP | 2014198448 A | * | 10/2014 |
| TW | 201520050 A | | 6/2015 |
| WO | WO 2012/032907 A1 | | 3/2012 |
| WO | WO 2013/147090 A1 | | 10/2013 |

OTHER PUBLICATIONS

International Search Report for PCT/JP2017/010664 dated Jun. 20, 2017.
Chinese Office Action and Search Report dated Oct. 12, 2020 for corresponding Application No. 201780030572.6 along with an English translation of the Office Action.

* cited by examiner

CURABLE COMPOSITION FOR FORMING PRIMER LAYER, GAS BARRIER LAMINATED FILM, AND GAS BARRIER LAMINATE

TECHNICAL FIELD

The present invention relates to a curable composition for forming a primer layer, a gas barrier laminated film having a primer layer made of the cured product of the curable composition, and a gas barrier laminate including an organic compound-containing layer laminated on the surface of the gas barrier laminated film.

BACKGROUND ART

In recent years, a film having gas barrier properties (hereinafter, referred to as "gas barrier film" in some cases) has been used as a substrate having an electrode instead of a glass plate so as to achieve thinning, weight saving and flexibility in a display such as a liquid crystal display and an electroluminescence (EL) display. Further, by laminating another layer on the gas barrier film, a film having a new function has been developed.

For example, an adhesive sheet including an adhesive layer formed on the gas barrier layer surface of a substrate having a gas barrier layer (gas barrier film) is described in Patent Literature 1. By using the adhesive sheet, an organic EL element and the like can be efficiently sealed.

CITATION LIST

Patent Literature

Patent Literature 1: International Publication No. WO 2012/032907 (US 2013209800 A1)

SUMMARY OF INVENTION

Technical Problem

As described in Patent Literature 1, a gas barrier laminate having a new function can be obtained by laminating, on the gas barrier layer of a gas barrier film, another layer having a specific function.

The gas barrier layer of a gas barrier film, however, generally has a low affinity with an organic compound-containing layer, and thus a gas barrier laminate obtained by forming an organic compound layer on the gas barrier layer of the gas barrier film tends to have poor interlayer adhesion.

The present invention was made in view of the above circumstances, and an object of the present invention is to provide a curable composition for forming a primer layer for suitable use in manufacturing a gas barrier laminate excellent in interlayer adhesion, a gas barrier laminated film having a primer layer made of the cured product of the curable composition, and a gas barrier laminate including an organic compound-containing layer laminated on the surface of the gas barrier laminated film.

Solution to Problem

The inventors conducted extensive studies with regard to a gas barrier laminated film having a gas barrier layer made of a gas barrier film in order to solve the above problem. As a result, the inventors found that a gas barrier laminated film having a primer layer made of the cured product of a curable composition for forming a specific primer layer on the surface allows an organic compound-containing layer to be formed on the primer layer with good adhesion, and the present invention was thus accomplished.

According to the present invention, a curable composition for forming a primer layer described in the following items (1) to (4), a gas barrier laminated film described in the following items (5) to (10), and a gas barrier laminate described in the following item (11) are provided.

(1) A curable composition for forming a primer layer of a gas barrier laminated film, comprising at least a polar group-containing polyolefin polymer and a polyfunctional acrylate compound.

(2) The curable composition for forming a primer layer according to item (1), wherein a content of the polyfunctional acrylate compound is 5 to 30 parts by mass based on 100 parts by mass of the polar group-containing polyolefin polymer.

(3) The curable composition for forming a primer layer according to item (1) or (2) further comprising a polyisocyanate crosslinking agent, wherein a content of the polyisocyanate crosslinking agent is 1 to 10 parts by mass based on 100 parts by mass of the polar group-containing polyolefin polymer.

(4) The curable composition for forming a primer layer according to any one of items (1) to (3) further comprising a silane coupling agent, wherein a content of the silane coupling agent is 0.01 to 5 parts by mass based on 100 parts by mass of the polar group-containing polyolefin polymer.

(5) A gas barrier laminated film comprising a gas barrier layer and a primer layer in direct contact with the gas barrier layer, wherein the gas barrier layer is made of a gas barrier film, the primer layer is made of a cured product of the curable composition for forming a primer layer according to any one of items (1) to (4), and at least one of outermost layers is the primer layer.

(6) The gas barrier laminated film according to item (5), wherein the gas barrier film has a thickness of 0.5 to 500 μm.

(7) The gas barrier laminated film according to item (5) or (6), wherein the gas barrier film is a laminated film comprising a resin substrate and a layer containing an inorganic compound and/or a metal.

(8) The gas barrier laminated film according to item (7), wherein the layer containing an inorganic compound and/or a metal is a silicon-containing polymer compound layer having a modified surface.

(9) The gas barrier laminated film according to any one of items (5) to (8), wherein the primer layer has a thickness of 0.05 to 2.5 μm.

(10) The gas barrier laminated film according to any one of items (5) to (9), further comprising another layer in direct contact with the gas barrier layer.

(11) A gas barrier laminate, comprising an organic compound-containing layer laminated on the primer layer constituting an outermost layer of the gas barrier laminated film according to any one of items (5) to (10).

Advantageous Effect of Invention

According to the present invention, a curable composition for forming a primer layer suitably used in manufacturing a gas barrier laminate excellent in interlayer adhesion, a gas barrier laminated film having a primer layer made of the cured product of the curable resin composition, and a gas barrier laminate comprising an organic compound-containing layer laminated on the surface of the gas barrier laminated film are provided.

DESCRIPTION OF EMBODIMENT

Hereinafter, the present invention is itemized into: 1) curable composition for forming primer layer; 2) gas barrier laminated film; and 3) gas barrier laminate, for detailed description.

1) Curable Composition for Forming Primer Layer

The curable composition for forming a primer layer of the present invention is a curable composition for forming a primer layer of a gas barrier laminated film, comprising at least a polar group-containing polyolefin polymer and a polyfunctional acrylate compound.

The polar group-containing polyolefin polymer contained in the curable composition for forming a primer layer is a polyolefin polymer that contains a polar group. By using the polar group-containing polyolefin polymer, a primer layer excellent in adhesion with a gas barrier layer can be efficiently formed.

The polyolefin polymer refers to a polymer that contains repeating units derived from olefins, such as a repeating unit derived from ethylene and a repeating unit derived from propylene. The content of the repeating units derived from olefins is usually 50 mol % or more, preferably 70 mol % or more, still more preferably 90 mol % or more, based on the total amount of repeating units.

Examples of the specific polyolefin polymer include polypropylene, high density polyethylene, ultra-high molecular weight polyethylene, linear low density polyethylene, low density polyethylene, ultra-low density polyethylene, super ultra-low density polyethylene, polymethyl pentene, an ethylene-propylene copolymer, a propylene-1-butene random copolymer, a propylene-ethylene-1-butene random copolymer, a copolymer of propylene and an α-olefin having 5 to 12 carbon atoms, a propylene-non-conjugated diene copolymer, an ethylene-non-conjugated diene copolymer, an ethylene-propylene-non-conjugated diene copolymer, polybutene, an ethylene-vinyl acetate copolymer, an ethylene-vinyl trimethoxysilane copolymer, an ethylene-methyl acrylate copolymer, an ethylene-ethyl acrylate copolymer, an ethylene-methyl methacrylate copolymer, a styrene-butadiene block copolymer, and a hydrogenated product thereof.

These polyolefin polymers may be used singly or may be used in combinations of two or more.

Examples of the polar group include a hydroxyl group, a carboxylic acid group, a carboxylic acid ester group, and an acid anhydride group. Among them, as the polar group, a carboxylic acid group, an acid anhydride group or a hydroxyl group is preferred and a hydroxyl group is more preferred.

The polar group-containing polyolefin polymer may be obtained by modifying a polyolefin polymer with a compound having a polar group, or copolymerizing an olefin monomer and a monomer having a polar group. Preferred examples of the polar group-containing polyolefin polymer include an acid-modified polyolefin polymer and a polyolefin polymer with a hydroxyl group introduced, which are described below.

Examples of the acid-modified polyolefin polymer include a polymer obtained by modifying a polyolefin resin with an unsaturated carboxylic acid or an anhydride thereof.

Examples of the unsaturated carboxylic acid or the anhydride thereof include maleic acid, fumaric acid, itaconic acid, citraconic acid, glutaconic acid, tetrahydrophthalic acid, aconitic acid, (meth)acrylic acid, maleic anhydride, itaconic anhydride, glutaconic anhydride, citraconic anhydride, aconitic anhydride, norbornene dicarboxylic anhydride, and tetrahydrophthalic anhydride. These may be used singly or in combinations of two or more.

Examples of the polyolefin polymer with a hydroxyl group introduced include a polymer obtained by terminal modification or graft modification of a polyolefin with a hydroxyl group-containing (meth)acrylate or a hydroxyl group-containing vinyl ether.

Examples of the hydroxyl group-containing (meth)acrylate include hydroxyethyl (meth)acrylate, hydroxypropyl (meth)acrylate, and glycerol (meth)acrylate.

Examples of the hydroxyl group-containing vinyl ether include 2-hydroxyethyl vinyl ether, diethylene glycol monovinyl ether, and 4-hydroxybutyl vinyl ether.

These may be used singly or in combinations of two or more.

The number average molecular weight (Mn) of the polar group-containing polyolefin polymer is preferably 500 to 500,000, more preferably 1,000 to 200,000, more preferably 1,200 to 150,000.

The polyfunctional acrylate compound contained in the curable composition for forming a primer layer has a function to cure the curable composition for forming a primer layer. Use of the curable composition for forming a primer layer containing a polyfunctional acrylate compound allows a primer layer with rare occurrence of cohesive failure to be formed.

The polyfunctional acrylate compound refers to an acrylic acid ester compound or a methacrylic acid ester compound having two or more unsaturated bonds to participate in a polymerization reaction.

Examples of the polyfunctional acrylate compound include a difunctional acrylate compound such as tricyclodecane dimethanol di(meth)acrylate, 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, di(acryloyloxyethyl)isocyanurate, and allylated cyclohexyl di(meth)acrylate;

a trifunctional acrylate compound such as trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, and tris(2-acryloyloxyethyl)isocyanurate;

a tetrafunctional acrylate compound such as diglycerol tetra (meth)acrylate and pentaerythritol tetra(meth)acrylate;

a pentafunctional acrylate compounds such as propionic acid-modified dipentaerythritol penta(meth)acrylate; and a hexafunctional acrylate compound such as dipentaerythritol hexa(meth)acrylate and caprolactone-modified dipentaerythritol hexa(meth)acrylate.

These polyfunctional acrylate compounds may be used singly or in combinations of two or more.

Herein, the term "(meth)acrylate" means acrylate or methacrylate.

The content of the polyfunctional acrylate compounds in the curable composition for forming a primer layer is usually 5 to 30 parts by mass, preferably 5 to 20 parts by mass, based on 100 parts by mass of a polar group-containing polyolefin polymer, from the viewpoint of formation of a primer layer with further rare occurrence of cohesive failure.

The curable composition for forming a primer layer may contain a photopolymerization initiator. Use of the curable composition for forming a primer layer that contains a photopolymerization initiator allows a curing reaction to be efficiently performed with exposure to ultraviolet rays or visible light for the formation of the primer layer.

Examples of the photopolymerization initiator include a ketone photopolymerization initiator such as 2,2-dimethoxy-1,2-diphenylethane-1-one and 1-hydroxy-cyclohexylphenyl ketone; a phosphorus photopolymerization initiator such as 2,4,6-trimethylbenzoyl-diphenylphosphine oxide, bis(2,4,6-trimethylbenzoyl)-phenylphosphine oxide, ethyl (2,4,6-trimethylbenzoyl)-phenylphosphinate, and bis(2,6-dimethoxybenzoyl)-2,4,4-trimethyl-pentylphosphine oxide; a titanocene photopolymerization initiator such as bis($\eta$5-2,4-cyclopentadien-1-yl)-bis[2,6-difluoro-3-(1H-pyrrol-1-yl)-phenyl]titanium; an oxime ester photopolymerization initiator; a benzophenone photopolymerization initiator such as benzophenone, p-chlorobenzophenone, and 4,4'-diethylaminobenzophenone; a thioxanthone photopolymerization initiator such as thioxanthone; and an amine photopolymerization initiator such as triisopropanolamine. These may be used singly or in combinations of two or more.

In the case where the curable composition for forming a primer layer contains a photopolymerization initiator, the content thereof is usually in the range of 0.01 to 20 parts by mass based on 100 parts by mass of the polyfunctional acrylate compound.

The curable composition for forming a primer layer may contain a polyisocyanate crosslinking agent. Use of the curable composition for forming a primer layer containing a polyisocyanate crosslinking agent allows a primer layer with further rare occurrence of cohesive failure to be formed.

The polyisocyanate crosslinking agent is not particularly limited, and a compound having two or more isocyanate groups in the molecule is used. Example of the polyisocyanate crosslinking agent include an aromatic polyisocyanate such as tolylene diisocyanate, diphenylmethane diisocyanate, and xylylene diisocyanate; an aliphatic polyisocyanate such as hexamethylene diisocyanate; an alicyclic polyisocyanates such as isophorone diisocyanate and hydrogenated diphenylmethane diisocyanate; and a biuret thereof, an isocyanurate thereof, and an adduct as a reaction product thereof with an active hydrogen-containing low-molecular compound such as ethylene glycol, propylene glycol, neopentyl glycol, trimethylol propane and castor oil. These may be used singly or in combinations of two or more.

In the case where the curable composition for forming a primer layer contains a polyisocyanate crosslinking agent, the content thereof is usually 1 to 10 parts by mass, preferably 2 to 8 parts by mass, based on 100 parts by mass of a polar group-containing polyolefin polymer, from the viewpoint of formation of a primer layer with further rare occurrence of cohesive failure.

The curable composition for forming a primer layer may contain a silane coupling agent. Use of the curable composition for forming a primer layer that contains a silane coupling agent allows a primer layer superior in interlayer adhesion to be formed.

Examples of the silane coupling agent include an amino silane coupling agent such as 3-aminopropyltrimethoxysilane, 3-aminopropyltriethoxysilane, 3-(2-aminoethyl)aminopropyltrimethoxysilane, 3-(2-aminoethyl)aminopropyltriethoxysilane, 3-(2-aminoethyl)aminopropylmethyldimethoxysilane, and 3-(2-aminoethyl)aminopropylmethyldiethoxysilane; an epoxy silane coupling agent such as 3-glycidoxypropyltrimethoxysilane and 3-glycidoxypropylmethyldimethoxysilane; 3-mercaptopropyltrimethoxysilane; 3-methacryloxypropyltrimethoxysilane; and a polymer silane coupling agent described in Japanese Patent Laid-Open No. 2000-239447 or Japanese Patent Laid-Open No. 2001-40037. These may be used singly or in combinations of two or more.

In the case where the curable composition for forming a primer layer contains a silane coupling agent, the content thereof is usually 0.01 to 5 parts by mass, preferably 0.01 to 3 parts by mass, based on 100 parts by mass of a polar group-containing polyolefin polymer.

The curable composition for forming a primer layer may contain a solvent.

The curable composition for forming a primer layer that contains a solvent is used as a coating solution for forming a primer.

Examples of the solvent include an aliphatic hydrocarbon solvent such as n-hexane and n-heptane; an aromatic hydrocarbon solvent such as toluene and xylene; a halogenated hydrocarbon solvent such as dichloromethane, ethylene chloride, chloroform, carbon tetrachloride, 1,2-dichloroethane and monochlorobenzene; an alcohol solvent such as methanol, ethanol, propanol, butanol, and propylene glycol monomethyl ether; a ketone solvent such as acetone, methyl ethyl ketone, 2-pentanone, isophorone and cyclohexanone; an ester solvent such as ethyl acetate and butyl acetate; a cellosolve solvent such as ethyl cellosolve; and an ether solvent such as 1,3-dioxolane.

The curable composition for forming a primer layer of the present invention can be prepared by appropriately mixing and stirring a polar group-containing polyolefin polymer, a polyfunctional acrylate compound, and other components such as a photopolymerization initiator, a polyisocyanate crosslinking agent, and a silane coupling agent according to a conventional method.

By using the curable composition for forming a primer layer of the present invention, a primer layer having a high affinity with an organic compound-containing layer can be efficiently formed on the gas barrier layer of a gas barrier film. The curable composition for forming a primer layer of the present invention, therefore, is suitably used in manufacturing a gas barrier laminate excellent in interlayer adhesion.

2) Gas Barrier Laminated Film

The gas barrier laminated film of the present invention is a gas barrier laminated film comprising a gas barrier layer and a primer layer in direct contact with the gas barrier layer, wherein the gas barrier layer is made of a gas barrier film, the primer layer is made of a cured product of the curable composition for forming a primer layer of the present invention, and at least one of the outermost layers is the primer layer.

(Gas Barrier Layer)

The gas barrier layer constituting the gas barrier laminated film of the present invention is formed of a gas barrier film as raw material.

The gas barrier film used in the present invention is a film having properties for suppressing the transmission of oxygen and water vapor (hereinafter, referred to as "gas barrier properties").

The gas barrier film used in the present invention has a water vapor transmission rate under an atmosphere of 40° C. and a relative humidity of 90% of preferably 5.0 g/m$^2$/day or less, more preferably 0.5 g/m$^2$/day or less. By using the gas barrier film having such gas barrier properties, a gas barrier laminated film superior in gas barrier properties can be obtained.

Further, the gas barrier film has a total light transmittance measured in accordance with JIS K 7361-1 of preferably 80% or more, more preferably 85% or more. By using the gas barrier film having such excellent transparency, a gas barrier laminated film excellent in transparency can be obtained.

The thickness of the gas barrier film is not particularly limited, and may be appropriately determined in accordance with the intended use of the gas barrier laminated film. The thickness of the gas barrier film is usually, 0.5 to 500 µm, preferably 1 to 100 µm.

Examples of the gas barrier film include a synthetic resin film, a laminated film made of two or more synthetic resin films, a surface-modified film made of synthetic resin film with a modified surface (except for those having a modified layer containing an inorganic compound and/or a metal), and a laminated film having a resin substrate and a layer containing an inorganic compound and/or a metal (hereinafter, referred to as "inorganic compound-containing layer" in some cases).

Among them, a laminated film having a resin substrate and an inorganic compound-containing layer is preferred as the gas barrier film. Such a gas barrier film is superior in gas barrier properties, so that a thinner and lighter gas barrier laminated film having excellent bending resistance can be easily obtained.

Examples of the material of the resin substrate for use in the laminated film having a resin substrate and an inorganic compound-containing layer include a polyimide, a polyamide, a polyamideimide, a polyphenylene ether, a polyether ketone, a polyether ether ketone, a polyolefins, a polyester, a polycarbonate, a polysulfone, a polyether sulfone, a polyphenylene sulfide, an acrylic resin, a cycloolefin polymer, and an aromatic polymer.

Among them, due to having excellent transparency and versatility, a polyester, a polyamide or a cycloolefin polymer are preferred and a polyester or a cycloolefin polymer are more preferred.

Examples of the polyester include a polyethylene terephthalate, a polybutylene terephthalate, a polyethylene naphthalate and a polyarylate, and a polyethylene terephthalate is preferred.

Examples of the polyamide include a wholly aromatic polyamide, nylon 6, nylon 66, and a nylon copolymer.

Examples of the cycloolefin polymer include a norbornene polymer, a monocyclic olefin polymer, a cyclic conjugated diene polymer, a vinyl alicyclic hydrocarbon polymer, and a hydride thereof. Specific examples thereof include APEL (an ethylene-cycloolefin copolymer manufactured by Mitsui Chemicals Inc.), ARTON (a norbornene polymer manufactured by JSR Corp.), and ZEONOR (a norbornene polymer manufactured by Zeon Corp.).

The resin substrate may contain various additives in the range where the effects of the present invention are not impaired. Examples of the additive include an ultraviolet absorber, an antistatic agent, a stabilizer, an antioxidant, a plasticizer, a lubricant, and a coloring pigment. The content of these additives may be appropriately determined according to the purpose.

The thickness of the resin substrate is usually in the range of 0.4 to 400 µm, preferably 0.5 to 95 µm, more preferably 0.9 to 90 µm.

The resin substrate can be obtained by preparing a resin composition containing a resin component and various additives on an as needed basis, and forming the composition into a film. The forming method is not particularly limited, and a known method such as casting or melt extrusion may be employed. Alternatively, a commercially available resin film may be used as the resin substrate.

The inorganic compound-containing layer is a layer having gas barrier properties.

The inorganic compound-containing layer may be formed on one surface of the resin substrate, or may be formed on both surfaces of the resin substrate. Further, the inorganic compound-containing layer may be a single layer, or may include a plurality of layers laminated.

Examples of the inorganic compound contained in the inorganic compound-containing layer include an inorganic oxide such as silicon oxide, aluminum oxide, magnesium oxide, zinc oxide, indium oxide, and tin oxide; an inorganic nitride such as silicon nitride; an inorganic carbide; an inorganic sulfide; an inorganic oxide nitride as a complex thereof; an inorganic oxide carbide; an inorganic nitride carbide; and inorganic oxide nitride carbide.

Examples of the metal contained in the inorganic compound-containing layer include aluminum, magnesium, zinc and tin.

The thickness of the inorganic compound-containing layer is usually 20 nm to 50 preferably 30 nm to 1 Ira, more preferably 40 nm to 500 nm, though not particularly limited.

The method for forming the inorganic compound-containing layer is not particularly limited. Example of the method include: a method for forming the inorganic compound or metal on a resin substrate by vapor deposition, sputtering, ion plating, thermal CVD, plasma CVD or the like (method 1); a forming method including dissolving or dispersing the inorganic compound or metal in an organic solvent, applying the liquid onto a resin substrate by a known coating method, and moderately drying the resulting coating film (method 2); a method including forming a layer that contains a silicon-containing polymer compound (silicon-containing polymer compound layer) on the resin substrate, either directly or through another layer, and then modifying the surface of the silicon-containing polymer compound layer (method 3). Incidentally, in the case where the inorganic compound-containing layer is formed by the method 3, the "inorganic compound-containing layer" refers to the combination of a modified surface part and an unmodified internal part.

Examples of the silicon-containing polymer compound include a polysilazane compound, a polycarbosilane compound, a polysilane compound, a polyorganosiloxane compound, a poly(disilanylene phenylene) compound, and a poly(disilanylene ethynylene) compound.

The silicon-containing polymer compound layer may contain other components in addition to the silicon-containing polymer compound, within the range where the objects of the present invention are not impaired. Examples of the other components include a curing agent, an antioxidant, a light stabilizer, and a flame retardant.

The content of the silicon-containing polymer compound in the silicon-containing polymer compound layer is preferably 50 mass % or more, more preferably 70 mass % or more, from the viewpoint of obtaining a gas barrier film superior in gas barrier properties.

The thickness of the silicon-containing polymer compound layer is usually 20 nm to 50 µm, preferably 30 nm to 1 µm, more preferably 40 nm to 500 nm, though not particularly limited.

The silicon-containing polymer compound layer can be formed, for example, by dissolving or dispersing a polymer compound in an organic solvent, applying the resulting liquid onto a resin substrate by a known coating method, and moderately drying the resulting coating film.

Examples of the method for modifying the surface of the silicon-containing polymer compound layer include ion implantation, plasma treatment, UV irradiation, and heat treatment.

Ion implantation is a method for modifying a silicon-containing polymer compound layer, including implanting accelerated ions into the silicon-containing polymer compound layer as described below.

Plasma treatment is a method for modifying a silicon-containing polymer compound layer, including exposing the silicon-containing polymer compound layer to plasma. For example, plasma treatment may be performed according to the method described in Japanese Patent Laid-Open No. 2012-106421.

UV irradiation is a method for modifying a silicon-containing polymer compound layer, including irradiating ultraviolet rays to the silicon-containing polymer compound layer. For example, UV modifying may be performed according to the method described in Japanese Patent Laid-Open No. 2013-226757.

Among these, ion implantation is preferred as the method for modifying the surface of a silicon-containing polymer compound layer, because a gas barrier film superior in gas barrier properties can be obtained through efficient modification of the internal part of the silicon-containing polymer compound layer without roughening of the surface thereof.

Examples of the more preferred process in the method 3 includes forming a polysilazane compound-containing layer (hereinafter, referred to as "polysilazane layer" in some cases) either directly or through another layer on a resin substrate, and then modifying the surface of the polysilazane layer by ion implantation.

The polysilazane compound contained in the polysilazane layer is a compound having a repeating unit containing an —Si—N— bond (silazane bond) in a molecule. Specifically, a compound having the repeating unit represented by Formula (1) is preferred:

[Formula 1]

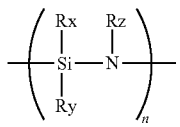

(1)

Preferably, the polysilazane compound for use has a number average molecular weight of 100 to 50,000, though not particularly limited.

In Formula (1), n represents any natural number. Rx, Ry and Rz each independently represent a hydrogen atom, an unsubstituted or substituted alkyl group, an unsubstituted or substituted cycloalkyl group, an unsubstituted or substituted alkenyl group, an unsubstituted or substituted aryl group, or a non-hydrolyzable group such as an alkylsilyl group.

Examples of the alkyl group of the unsubstituted or substituted alkyl group include an alkyl group having 1 to 10 carbon atoms such as a methyl group, an ethyl group, a n-propyl group, an isopropyl group, a n-butyl group, an isobutyl group, a sec-butyl group, a t-butyl group, a n-pentyl group, an isopentyl group, a neopentyl group, a n-hexyl group, a n-heptyl group, and a n-octyl group.

Examples of the cycloalkyl group of the unsubstituted or substituted cycloalkyl group include a cycloalkyl group having 3 to 10 carbon atoms such as a cyclobutyl group, a cyclopentyl group, a cyclohexyl group, and a cycloheptyl group.

Examples of the alkenyl group of the unsubstituted or substituted alkenyl group include an alkenyl group having 2 to 10 carbon atoms such as a vinyl group, a 1-propenyl group, a 2-propenyl group, a 1-butenyl group, a 2-butenyl group, and a 3-butenyl group.

Examples of the substituent of the alkyl group, the cycloalkyl group and the alkenyl group include a halogen atom such as a fluorine atom, a chlorine atom, a bromine atom, and an iodine atom; a hydroxyl group; a thiol group; an epoxy group; a glycidoxy group; a (meth)acryloyloxy group; and an aryl group having an unsubstituted or substituted group such as a phenyl group, a 4-methylphenyl group, and a 4-chlorophenyl group.

Examples of the aryl group of the unsubstituted or substituted aryl group include an aryl group having 6 to 15 carbon atoms such as a phenyl group, a 1-naphthyl group, and a 2-naphthyl group.

Examples of the substituent of the aryl group include a halogen atom such as a fluorine atom, a chlorine atom, a bromine atom and an iodine atom; an alkyl group having 1 to 6 carbon atoms such as a methyl group and an ethyl group; an alkoxy group having 1 to 6 carbon atoms such as a methoxy group and an ethoxy group; a nitro group; a cyano group; a hydroxyl group; a thiol group, an epoxy group; a glycidoxy group; a (meth)acryloyloxy group; and an unsubstituted or substituted aryl group such as a phenyl group, a 4-methylphenyl group, and 4-chlorophenyl group.

Examples of the alkyl silyl group include a trimethylsilyl group, a triethylsilyl group, a triisopropylsilyl group, a tri-t-butylsilyl group, a methyl diethyl silyl group, a dimethylsilyl group, a diethylsilyl group, a methylsilyl group, and an ethylsilyl group.

Among them, as Rx, Ry or Rz, a hydrogen atom, an alkyl group having 1 to 6 carbon atoms, or a phenyl group is preferred, and a hydrogen atom is particularly preferred.

The polysilazane compound having a repeating unit represented by Formula (1) may be either one of an inorganic polysilazane with all of Rx, Ry and Rz being hydrogen atoms, and an organic polysilazane with at least one of Rx, Ry and Rz not being a hydrogen atom.

In the present invention, a polysilazane-modified product may be used as the polysilazane compound. Examples of the polysilazane-modified product include ones described in Japanese Patent Laid-Open No. 62-195024, Japanese Patent Laid-Open No. 2-84437, Japanese Patent Laid-Open No. 63-81122, Japanese Patent Laid-Open No. 1-138108, Japanese Patent Laid-Open No. 2-175726, Japanese Patent Laid-Open No. 5-238827, Japanese Patent Laid-Open No. 5-238827, Japanese Patent Laid-Open No. 6-122852, Japanese Patent Laid-Open No. 6-306329, Japanese Patent Laid-Open No. 6-299118, Japanese Patent Laid-Open No. 9-31333, Japanese Patent Laid-Open No. 5-345826, or Japanese Patent Laid-Open No. 4-63833.

Among them, a perhydropolysilazane with all of Rx, Ry and Rz being hydrogen atoms is preferred as the polysilazane compound, from the viewpoints of availability and formability of an ion implantation layer excellent in gas barrier properties.

Alternatively, a commercially available glass coating material may be directly used as the polysilazane compound.

The polysilazane compounds may be used singly or in combinations of two or more.

The method for forming a polysilazane layer is not particularly limited. For example, a polysilazane layer may be formed by preparing a solution for forming a polysilazane layer that contains at least one polysilazane compound, another component on an as needed basis and a solvent, applying the solution for forming a polysilazane layer by a known method, and drying the resulting coating film.

Examples of the solvent for use in the solution for forming a polysilazane layer include an aromatic hydrocarbon solvent such as benzene and toluene; an ester solvent such as ethyl acetate and butyl acetate; a ketone solvent such as acetone, methyl ethyl ketone and methyl isobutyl ketone; an aliphatic hydrocarbon solvent such as n-pentane, n-hexane and n-heptane; and an alicyclic hydrocarbon solvent such as cyclopentane and cyclohexane.

These solvents may be used singly or in combinations of two or more.

Examples of the method for applying the solution for forming the polysilazane layer include bar coating, spin coating, dipping, roll coating, gravure coating, knife coating, air knife coating, roll knife coating, die coating, screen printing, spray coating and gravure offset printing.

The resulting coating film is dried to form a polysilazane layer. The method for drying the coating film is not particularly limited. For example, a conventionally known drying method such as hot air drying, hot roll drying, and infrared irradiation may be employed. The heating temperature is usually 80 to 150° C., and the heating time is usually several tens of seconds to several tens of minutes.

Examples of the ions to be implanted into the polysilazane layer include ions of rare gas such as argon, helium, neon, krypton and xenon; ions of fluorocarbon, hydrogen, nitrogen, oxygen, carbon dioxide, chlorine, fluorine or sulfur; ions of alkane gas such as methane and ethane; ions of alkene gas such as ethylene and propylene; ions of alkadiene gas such as pentadiene and butadiene; ions of alkyne gas such as acetylene; ions of aromatic hydrocarbon gas such as benzene and toluene; ions of cycloalkane gas such as cyclopentane; ions of cycloalkene gas such as cyclopentene; ions of metal; and ions of an organic silicon compound.

These ions can be used singly or in combinations of two or more.

Among these, ions of rare gas such as argon, helium, neon, krypton and xenon are preferred, because the ions can be more easily implanted to make a gas barrier film superior in gas barrier properties.

The amount of ions implanted may be appropriately determined in accordance with the intended use of the gas barrier laminated film (gas barrier properties required, transparency, etc.).

Examples of the method for implanting ions include irradiating ions accelerated by an electric field (ion beams), and implanting ions in plasma. Among them, the latter, i.e., a method for implanting plasma ions (plasma ion implantation method), is preferred, because an intended gas barrier layer can be easily formed.

In plasma ion implantation method, for example, plasma is generated in an atmosphere containing a plasma-generating gas such as rare gas, and a negative high voltage pulse is applied to a polysilazane layer, so that ions in the plasma (cations) are implanted into the surface portion of the polysilazane layer. More specifically, plasma ion implantation method can be carried out by the method described in a pamphlet WO 2010/107018.

In ion implantation, the thickness of a region where ions are implanted may be controlled by the type of ions and the implantation conditions such as the applied voltage and the processing time, and may be determined to be usually 10 to 400 nm depending on the thickness of the polysilazane layer and the intended use of the gas barrier laminated film.

The ion implantation can be confirmed through elemental analysis of the polysilazane layer in the vicinity at a depth of 10 nm from the surface by X-ray photoelectron spectroscopy (XPS).

By performing the method described above, the surface of the polysilazane layer can be modified by ion implantation.

Further, the surface of a precursor layer other than the polysilazane layer can be modified by ion implantation in the same manner.

(Primer Layer)

The primer layer constituting the gas barrier laminated film of the present invention is a layer in direct contact with a gas barrier layer made of the gas barrier film, which is made of the cured product of the curable composition for forming a primer layer of the present invention.

The primer layer contributes to the improvement of interlayer adhesion, when a layer containing an organic compound is further laminated on the gas barrier laminated film of the present invention.

The thickness of the primer layer is not particularly limited, and may be appropriately determined in accordance with the intended use of the gas barrier laminated film. The thickness of the primer layer is usually, 0.05 to 2.5 µm, preferably 0.10 to 1.0 µm.

The primer layer can be formed by applying the curable composition for forming a primer layer of the present invention (coating solution for forming a primer layer) to one or both sides of a gas barrier film, drying the resulting coating film on an as needed basis, and then curing the coating film.

As the method for applying the coating solution for forming the primer layer, a conventional wet coating method may be used. Examples of the method include dipping, roll coating, gravure coating, knife coating, air knife coating, roll knife coating, die coating, screen printing, spray coating, and gravure offset printing.

Examples of the method for drying the coating film include a conventionally known drying method such as hot air drying, hot roll drying, and infrared irradiation.

The method for curing the coating film is not particularly limited, and known methods can be employed. For example, in the case where the curable composition for forming a primer layer contains a photopolymerization initiator, the coating film may be cured by irradiating active energy rays to the coating film. The irradiation of active energy rays can be performed by using a high pressure mercury lamp, an electrodeless lamp, a xenon lamp or the like.

The wavelength of the active energy rays is preferably 200 to 400 nm, more preferably 350 to 400 nm. The irradiation level is usually in the following ranges: an illuminance of 50 to 1000 mW/cm$^2$, and an amount of light of 50 to 5000 mJ/cm$^2$, preferably 1000 to 5000 mJ/cm$^2$. The irradiation time is usually 0.1 to 1000 seconds, preferably 1 to 500 seconds, more preferably 10 to 100 seconds. Taking the thermal load in the light irradiation step into consideration, the irradiation may be performed more than once to satisfy the amount of light.

Alternatively, the coating film may be cured by irradiating electron beams to the coating film layer. In the case where electron beams are irradiated, the coating film may be usually cured without use of a photopolymerization initiator. In the case where electron beams are irradiated, an electron beam accelerator or the like may be used. Irradiation level is usually in the range of 10 to 1000 krad. The irradiation time is usually 0.1 to 1000 seconds, preferably from 1 to 500 seconds, more preferably 10 to 100 seconds.

(Gas-Barrier Laminated Film)

The gas barrier laminated film of the present invention includes the gas barrier layer and a primer layer in direct contact with the gas barrier layer, wherein at least one of the outermost layers is the primer layer.

Since at least one of the outermost layers of the gas barrier laminated film is the primer layer, an organic compound-containing layer can be formed on the surface thereof with good adhesion.

Examples of the organic compound-containing layer include a protective layer, an adhesive layer, and a quantum dot layer.

These organic compound-containing layers are the same as the organic compound-containing layers in a gas barrier laminate which is described below.

The gas barrier laminated film may have a layer in direct contact with the gas barrier layer in addition to the primer layer. Examples of the layer include a protective layer and an adhesive layer.

Examples of the layer structure of gas barrier laminated film of the present invention include the following ones, though not limited thereto.

(i) gas barrier layer/primer layer
(ii) primer layer (A)/gas barrier layer/primer layer (B)
(iii) adhesive layer/gas barrier layer/primer layer
(iv) hard coat layer/gas barrier layer/primer layer The thickness of the gas barrier laminated film of the present invention is preferably 1 to 600 μm, more preferably 5 to 200 μm, particularly preferably 20 to 100 μm, though not particularly limited.

The gas barrier laminated film of the present invention has a water vapor transmission rate of preferably 5.0 g/m$^2$/day or less, more preferably 0.5 g/m$^2$/day or less, under an atmosphere of 40° C. and a relative humidity of 90%. The lower limit is not particularly limited, and usually 1×10$^{-6}$ g/m$^2$/day or more, though a smaller lower limit is preferred.

The water vapor transmission rate can be measured by the method described in Examples.

Preferably, the gas barrier laminated film of the present invention is excellent in transparency. The total light transmittance of the gas barrier laminated film of the present invention measured in accordance with JIS K 7361-1 is preferably 80% or more, more preferably 85% or more.

The gas barrier laminated film of the present invention is excellent in gas barrier properties and allows an organic compound-containing layer to be formed on the surface with good adhesion. The gas barrier laminated film of the present invention can be, therefore, suitably used as the material film in manufacturing a further high-performance gas barrier laminate.

2) Gas Barrier Laminate

The gas barrier laminate of the present invention includes an organic compound-containing layer laminated on the primer layer constituting the outermost layer of the gas barrier laminated film of the present invention.

Examples of the organic compound-containing layer formed on the primer layer include a protective layer, an adhesive layer and a quantum dot layer.

The protective layer functions to protect the gas barrier laminate, when an impact is applied from the outside.

Preferably, the protective layer is excellent in transparency and scratch resistance. Further, in the case where the protective layer is disposed on the outermost surface when incorporated in an electronic device or an optical device, preferably the protective layer is provided with functions such as stain resistance, fingerprint adhesion prevention, antistatic property, water repellency, and hydrophilicity.

The material of the protective layer is not particularly limited, and a known material can be used. Examples thereof include a silicon-containing compound; a photopolymerizable compound made of a photopolymerizable monomer and/or a photopolymerizable prepolymer, and a polymerizable composition containing a polymerization initiator that generates radicals by light at least in the visible light region; a resin such as a polyester resin, a polyurethane resin (in particular, two-component curable resin of a polyacrylic polyol, a polyester polyol, or a polyether polyol and an isocyanate compound), an acrylic resin, a polycarbonate resin, a vinyl chloride/vinyl acetate copolymer, a polyvinyl butyral resin, and a nitrocellulose resin; an alkyl titanate; and ethylene imine.

These may be used singly or in combinations of two or more.

An active energy ray-curable compound, a photopolymerization initiator and the like can be used.

The protective layer can be formed by a known method including applying a coating solvent for forming a protective layer in which the materials are dissolved or dispersed in an appropriate solvent, drying the resulting coating film on an as needed basis, and then curing the coating film.

The application method of the coating solution for forming a protective layer and the method for drying and curing the coating film are the same as described in the method for forming a primer layer.

The thickness of the protective layer is appropriately selected without any particular limitation. The thickness of the protective layer is usually 0.05 to 10 μm, preferably 0.1 to 8.0 μm, more preferably 0.2 to 5 μm.

The adhesive layer imparts adhesiveness to the gas barrier laminate.

The type of an adhesive constituting the adhesive layer is not particularly limited. The adhesive layer may comprise, for example, an acrylic adhesive, a urethane adhesive, a silicone adhesive, and a rubber adhesive.

The thickness of the adhesive layer is appropriately selected without any particular limitation. The thickness of the adhesive layer is usually 0.5 to 100 μm, preferably 1 to 60 μm, more preferably 3 to 40 μm.

The quantum dot layer is a layer including quantum dots dispersed in a polymer compound.

The quantum dot is a metal compound having a diameter of several nm, having a specific light absorption.

Having a quantum dot layer, the gas barrier laminate can be suitably used as a material film of an optical component and the like.

The thickness of the quantum dot layer is appropriately selected, without any particular limitation. The thickness of the quantum dot layer is usually 1 to 500 μm, preferably 10 to 400 μm, more preferably 5 to 200 μm.

Examples of the layer structure of the gas barrier laminate of the present invention include the following, though not limited thereto.

(i) gas barrier layer/primer layer/protective layer
(ii) gas barrier layer/primer layer/adhesive layer
(iii) gas barrier layer/primer layer/quantum dot layer
(iv) primer layer (A)/gas barrier layer/primer layer (B)/protective layer
(v) primer layer (A)/gas barrier layer/primer layer (B)/adhesive layer
(vi) primer layer (A)/gas barrier layer/primer layer (B)/quantum dot layer (vii) adhesive layer/gas barrier layer/primer layer/protective layer (viii) adhesive layer/gas barrier layer/primer layer/adhesive layer (ix) adhesive layer/gas barrier layer/primer layer/quantum dot layer (x) hard coat layer/gas barrier layer/primer layer/protective layer (xi) hard coat layer/gas barrier layer/primer layer/adhesive layer (xii) hard coat layer/gas barrier layer/primer layer/quantum dot layer The gas barrier laminate of the present invention is excellent in gas barrier properties and interlayer adhesion. The gas barrier laminate of the present invention can be, therefore, suitably used as a component for use in an electronic device.

EXAMPLES

Hereinafter, the present invention is described in more detail with reference to Examples. The present invention, however, is not intended to be limited to the following examples.

The parts and percentages in the Examples are based on mass unless otherwise specified.

<Manufacturing Example 1> Manufacturing of Gas Barrier Film (1)

A coating agent composed mainly of perhydropolysilazane (AQUAMICA NL110-20 manufactured by AZ Electronic Materials, solvent: xylene, concentration: 10%) was applied to a polyethylene terephthalate film having a thickness of 50 μm (hereinafter referred to as "PET film (1)") (PET50A4300 manufactured by Toyobo Co., Ltd.) by a spin coater (MS-A200, manufactured by Mikasa Co., Ltd., rotation speed: 3000 rpm, rotation time: 30 seconds) so as to make a coating film. The resulting PET film (1) with a coating film was heated at 120° C. for 2 minutes, so that a polysilazane layer having a thickness of 150 nm was formed on the PET film (1).

Subsequently, plasma ions were implanted into the polysilazane layer by a plasma ion implantation apparatus under the following conditions to modify the surface of the polysilazane layer, so that a gas barrier film (1) was obtained.

<Plasma Ion Implantation Processing Conditions>

Plasma generating gas: argon

Gas flow rate: 100 sccm

Duty ratio: 0.5%

Repetition frequency: 1000 Hz

Applied voltage: −10 kV

RF output: 1000 W

RF power: (frequency) 13.56 MHz, (applied power) 1000 W

Chamber internal pressure: 0.2 Pa

Pulse width: 5 μsec

Processing time (ion implantation time): 5 minutes

Transportation speed: 0.2 m/min

<Manufacturing Example 2> Manufacturing of Gas Barrier Film (2)

A silicon oxide film having a thickness of 50 nm was formed on the PET film (1) by vacuum deposition, so that a gas barrier film (2) was obtained.

<Manufacturing Example 3> Manufacturing of Gas Barrier Film (3)

An aluminum oxide film having a thickness of 20 nm was formed on the PET film (1) by vacuum deposition, so that a gas barrier film (3) was obtained.

<Example 1> Preparation of Coating Solution (1) for Forming Primer Layer

To obtain a coating solution (1) for forming a primer layer, 100 parts of a polar group-containing polyolefin polymer (1) (UNISTOLE P-801 manufactured by Mitsui Chemicals, Inc.), 5 parts of tricyclodecane dimethanol diacrylate (A-DCP manufactured by Shin-Nakamura Chemical Co., Ltd.) (polyfunctional acrylate compound (1)), 5 parts of dipentaerythritol hexaacrylate (A-DPH manufactured by Shin Nakamura Chemical Co., Ltd.,) (polyfunctional acrylate compound (2)), 0.3 parts of a photopolymerization initiator (1) (IRGACURE 184 manufactured by BASF Corp.), and 846 parts of toluene were mixed.

<Example 2> Preparation of Coating Solution (2) for Forming Primer Layer

To obtain a coating solution (2) for forming a primer layer, 100 parts of a polar group-containing polyolefin polymer (1), 5 parts of a polyfunctional acrylate compound (1), 5 parts of a polyfunctional acrylate compound (2), 0.3 parts of a photopolymerization initiator (1), 5 parts of a polyisocyanate crosslinking agent (1) (CORONATE HX manufactured by Nippon Polyurethane Industry Co., Ltd.), 0.3 parts of a silane coupling agent (1) (KBM-403 manufactured by Shin-Etsu Chemical Co., Ltd.), and 846 parts of toluene were mixed.

<Example 3> Preparation of Coating Solution (3) for Forming Primer Layer

A coating solution (3) for forming a primer layer was obtained in the same manner as in Manufacturing Example 2, except that a polar group-containing polyolefin polymer (2) (UNISTOLE P-901 manufactured by Mitsui Chemicals, Inc.) was used instead of the polar group-containing polyolefin polymer (1) in Example 1.

<Example 4> Preparation of Coating Solution (4) for Forming Primer Layer

To obtain a coating solution (4) for forming a primer layer, 100 parts of the polar group-containing polyolefin polymer (1), 10 parts of tris(2-acryloyloxyethyl)isocyanurate (A-9300 manufactured by Shin-Nakamura Chemical Co., Ltd.) (polyfunctional acrylate compound (3)), 0.3 parts of the photopolymerization initiator (1), and 846 parts of toluene were mixed.

<Comparative Example 1> Preparation of Coating Solution (5) for Forming Primer Layer To obtain a coating solution (5) for forming a primer layer, 70 parts of a polar group-containing polyolefin polymer (3) (AUROREN 353S manufactured by Nippon Paper Industries Co., Ltd.), 30 parts of a terpene phenol resin (YS POLYSTAR TH130 manufactured by Yasuhara Chemical Co. Ltd.), and 900 parts of toluene were mixed.

Example 5

The coating solution (1) for forming a primer layer obtained in Example 1 was applied to the modified surface of the gas barrier film (1) obtained in Manufacturing Example 1 so as to have a film thickness of 150 nm with a Mayer bar.

The resulting coating film was dried at 110° C. for 1 minute, and then exposed to UV radiation at an illuminance of 140 mW/cm$^2$, and an amount of light of 300 mJ/cm$^2$, with an electrodeless UV lamp system (manufactured by Heraeus) to form a primer layer. A gas barrier laminated film (α1) was thus obtained.

Subsequently, a UV-curable acrylate resin (1) (OPSTAR 27530 manufactured by JSR Corp.) was laminated on the primer layer of the gas barrier laminated film (α1) so as to have a thickness of 10 μm, and the laminated product was exposed to UV radiation at an illuminance of 140 mW/cm$^2$ and an amount of light of 800 mJ/cm$^2$, using an electrodeless UV lamp system (manufactured by Heraeus). A gas barrier laminate (β1) was thus obtained.

Example 6

A gas barrier laminated film (α2) and a gas barrier laminate (β2) were obtained in the same manner as in Example 5, except that the coating solution (2) for forming a primer layer obtained in Example 2 was used instead of the coating solution (1) for forming a primer layer in Example 5.

Example 7

A gas barrier laminated film (α3) and a gas barrier laminate (β3) were obtained in the same manner as in Example 5, except that the coating solution (3) for forming a primer layer obtained in Example 3 was used instead of the coating solution (1) for forming a primer layer in Example 5.

Example 8

A gas barrier laminated film (α4) and a gas barrier laminate (β4) were obtained in the same manner as in Example 5, except that the coating solution (4) for forming a primer layer obtained in Example 4 was used instead of the coating solution (1) for forming a primer layer in Example 5.

Example 9

A gas barrier laminated film (α5) and a gas barrier laminate (β5) were obtained in the same manner as in Example 5, except that the gas barrier film (2) obtained in Manufacturing Example 2 was used instead of the gas barrier film (1) in Example 5.

Example 10

A gas barrier laminated film (α6) and a gas barrier laminate (β6) were obtained in the same manner as in Example 5, except that the gas barrier film (3) obtained in Manufacturing Example 3 was used instead of the gas barrier film (1) in Example 5.

Comparative Example 2

A gas barrier laminated film (7) was obtained by laminating a UV-curable acrylate resin (1) directly on the gas barrier film (1) so as to have a thickness of 10 μm without formation of a primer layer in Example 5, and then curing the resulting laminated product through exposure to UV radiation at an illuminance of 140 mW/cm$^2$ and an amount of light of 800 mJ/cm$^2$, using an electrodeless UV lamp system (manufactured by Heraeus).

Comparative Example 3

A gas barrier laminated film (α8) and a gas barrier laminate (β8) were obtained in the same manner as in Example 5, except that a primer layer having a thickness of 150 nm was formed by applying an organic-inorganic hybrid resin (OPSTAR 27530 manufactured by JSR Corp.) on the gas barrier film (1), drying the coating film, and exposing the coating film to UV radiation, instead of using the coating solution (1) for forming a primer layer to form the primer layer in Example 5.

Comparative Example 4

A gas barrier laminated film (α9) and a gas barrier laminate (β9) were obtained in the same manner as in Example 5, except that the coating solution (5) for forming a primer layer obtained in Comparative Example 1 was used instead of the coating solution (1) for forming a primer layer in Example 5.

The gas barrier laminates obtained in Examples 5 to 10 and Comparative Examples 2 to 4 were evaluated as follows. The results are shown in Table 1.

<Evaluation on Interlayer Adhesion>
(Evaluation on Interlayer Adhesion 1)

Test pieces of the gas barrier laminated film (7), and the gas barrier laminates (β1) to (β6), (β8) and (β9) were subjected to a cross-cut test in accordance with JIS K 5600-5-6, and hence the interlayer adhesion was evaluated based on the following criteria.

Good: Out of 100 squares, the number of peeled squares is 0 in 100.

Fair: Out of 100 squares, the number of peeled squares is 1 to 49 in 100.

Poor: Out of 100 squares, the number of peeled squares is 50 to 100 in 100.

(Evaluation on Interlayer Adhesion 2)

The test was performed in the same manner as in the interlayer adhesion test 1, except that the test pieces were left to stand under an atmosphere of 60° C. and a relative humidity of 90% for 250 hours.

<Evaluation on Gas Barrier Properties>

The water vapor transmission rate of test pieces of the gas barrier laminated films (α1) to (α6), (7), (α8) and (α9) were measured by a water vapor transmission rate tester (PERMATRAN manufactured by Mocon Inc.). The measurement was performed under an atmosphere of 40° C. and a relative humidity of 90%.

<Evaluation on Transparency>

The total light transmittance of test pieces of the gas barrier laminated films (α1) to (α6), (7), (α8) and (α9) were measured in accordance with JIS K 7361-1, and hence the transparency was evaluated based on the following criteria.

Good: The total light transmittance is 80% or more.
Poor: The total light transmittance is less than 80%.

TABLE 1

|  |  | Interlayer adhesion evaluation 1 | Interlayer adhesion evaluation 2 | Water vapor transmission rate (g/m²/day) | Total light transmittance (%) [Transparency evaluation] |
|---|---|---|---|---|---|
| Example | 5 | Good | Fair | less than 0.02 | 91 Good |
|  | 6 | Good | Good | less than 0.02 | 90 Good |
|  | 7 | Good | Fair | less than 0.02 | 90 Good |
|  | 8 | Good | Fair | less than 0.02 | 90 Good |
|  | 9 | Good | Good | 0.5 | 89 Good |
|  | 10 | Good | Good | 7.2 | 88 Good |
| Comparative Example | 2 | Poor | Poor | less than 0.02 | 91 Good |
|  | 3 | Poor | Poor | less than 0.02 | 90 Good |
|  | 4 | Poor | Poor | less than 0.02 | 90 Good |

From Table 1, the following have been found.

The gas barrier laminates (β1) to (β6) in Examples 5 to 10 have excellent interlayer adhesion and water vapor blocking properties.

In particular, the gas barrier laminate (β2) in Example 6 is excellent in both of interlayer adhesion and water vapor blocking properties.

The gas barrier laminated film (7) in Comparative Example 2 has no primer layer, and therefore has poor interlayer adhesion.

The gas barrier laminates (β8) and (β9) in Comparative Examples 3 and 4 have a primer layer with a conventional composition, and they also have poor interlayer adhesion.

The invention claimed is:

1. A gas barrier laminate, comprising an organic compound-containing layer laminated on a primer layer constituting an outermost layer of a gas barrier laminated film, wherein the gas barrier laminated film comprises a gas barrier layer and the primer layer in direct contact with the gas barrier layer, wherein
the gas barrier layer is made of a gas barrier film,
the primer layer is made of a cured product of a curable composition comprising at least a polar group-containing polyolefin polymer, a polyfunctional acrylate compound, and a silane coupling agent and,
the organic compound-containing layer is a protective layer, an adhesive layer, or a quantum dot layer.

2. The gas barrier laminate according to claim 1, wherein a content of the polyfunctional acrylate compound is 5 to 30 parts by mass based on 100 parts by mass of the polar group-containing polyolefin polymer.

3. The gas barrier laminate according to claim 1, wherein the curable composition further comprises a polyisocyanate crosslinking agent, and wherein a content of the polyisocyanate crosslinking agent is 1 to 10 parts by mass based on 100 parts by mass of the polar group-containing polyolefin polymer.

4. The gas barrier laminate according to claim 1, wherein a content of the silane coupling agent is 0.01 to 5 parts by mass based on 100 parts by mass of the polar group-containing polyolefin polymer.

5. The gas barrier laminate according to claim 1, wherein a content of the silane coupling agent is 0.01 to 3 parts by mass based on 100 parts by mass of the polar group-containing polyolefin polymer.

6. The gas barrier laminate according to claim 1, wherein the gas barrier film has a thickness of 0.5 to 500 μm.

7. The gas barrier laminate according to claim 1, wherein the gas barrier film is a laminated film comprising a resin substrate and a layer containing an inorganic compound and/or a metal.

8. The gas barrier laminate according to claim 7, wherein the layer containing the inorganic compound and/or the metal is a silicon-containing polymer compound layer having a modified surface.

9. The gas barrier laminate according to claim 1, wherein the primer layer has a thickness of 0.05 to 2.5 μm.

10. The gas barrier laminate according to claim 1, further comprising another layer in direct contact with the gas barrier layer.

* * * * *